US011524556B2

(12) United States Patent
Brentzel

(10) Patent No.: US 11,524,556 B2
(45) Date of Patent: Dec. 13, 2022

(54) LIGHT-REDUCING DEVICES AND METHODS OF USE

(71) Applicant: Alan Brentzel, Lothian, MD (US)

(72) Inventor: Alan Brentzel, Lothian, MD (US)

( * ) Notice: Subject to any disclaimer, the term of this patent is extended or adjusted under 35 U.S.C. 154(b) by 578 days.

(21) Appl. No.: 16/529,446

(22) Filed: Aug. 1, 2019

(65) Prior Publication Data

US 2020/0039333 A1 Feb. 6, 2020

Related U.S. Application Data

(60) Provisional application No. 62/713,017, filed on Aug. 1, 2018.

(51) Int. Cl.
*B60J 3/04* (2006.01)
*G02B 5/22* (2006.01)
*G02B 5/00* (2006.01)

(52) U.S. Cl.
CPC .............. *B60J 3/04* (2013.01); *G02B 5/003* (2013.01); *G02B 5/22* (2013.01)

(58) Field of Classification Search
CPC ........... B60J 3/04; B60J 3/0286; G02B 5/003; G02B 5/22
See application file for complete search history.

(56) References Cited

U.S. PATENT DOCUMENTS

| | | | | |
|---|---|---|---|---|
| 3,868,293 A | * | 2/1975 | Selph .................. | B60J 3/06 359/488.01 |
| 4,172,613 A | * | 10/1979 | Furando ................ | B60J 3/0208 160/DIG. 3 |
| 4,634,637 A | * | 1/1987 | Oliver ...................... | B32B 7/12 428/209 |
| 4,862,944 A | * | 9/1989 | Hendershot ............ | B60J 3/0286 160/354 |
| 5,002,326 A | * | 3/1991 | Westfield ............... | B60J 1/2094 160/370.21 |
| 5,165,462 A | * | 11/1992 | Kang ..................... | B60J 3/0286 160/370.21 |
| 5,588,476 A | * | 12/1996 | Trethewey ............. | B60J 3/0286 248/205.8 |
| 5,829,507 A | * | 11/1998 | Pawlowski ............ | B60J 3/0286 160/368.1 |
| 6,143,387 A | * | 11/2000 | Kubler ................... | B32B 27/36 65/60.1 |

(Continued)

*Primary Examiner* — Balram T Parbadia
(74) *Attorney, Agent, or Firm* — Hartman Global IP Law; Gary M. Hartman; Domenica N. S. Hartman

(57) ABSTRACT

Light-reducing devices that can be removably attached to a window or other panel through which light is able to pass, and methods of using such devices. Such a light-reducing device includes a tinted flexible transparent sheet and a microsuction tape adhered to the tinted flexible transparent sheet. The microsuction tape has a surface with micrometer-sized cavities that create a vacuum when the surface is pressed against a window. At least the surface of the tape is formed of a material that is sufficiently pliable and elastic so that each of the cavities forms a seal against the window and individual vacuums created between the surface and the window releasably secure the light-reducing device to the window when subjected to only the weight of the light-reducing device, but the light-reducing device can be peeled from the window.

20 Claims, 3 Drawing Sheets

(56) References Cited

U.S. PATENT DOCUMENTS

| | | | | |
|---|---|---|---|---|
| 6,143,391 A * | 11/2000 | Barnes | ................... | F16B 47/00 |
| | | | | 248/205.8 |
| 7,163,252 B1 * | 1/2007 | Neault | ...................... | B60J 3/00 |
| | | | | 296/97.7 |
| 7,238,401 B1 * | 7/2007 | Dietz | ............... | B32B 17/10009 |
| | | | | 428/41.7 |
| 10,477,987 B2 * | 11/2019 | White | ................... | A47F 5/0807 |

\* cited by examiner

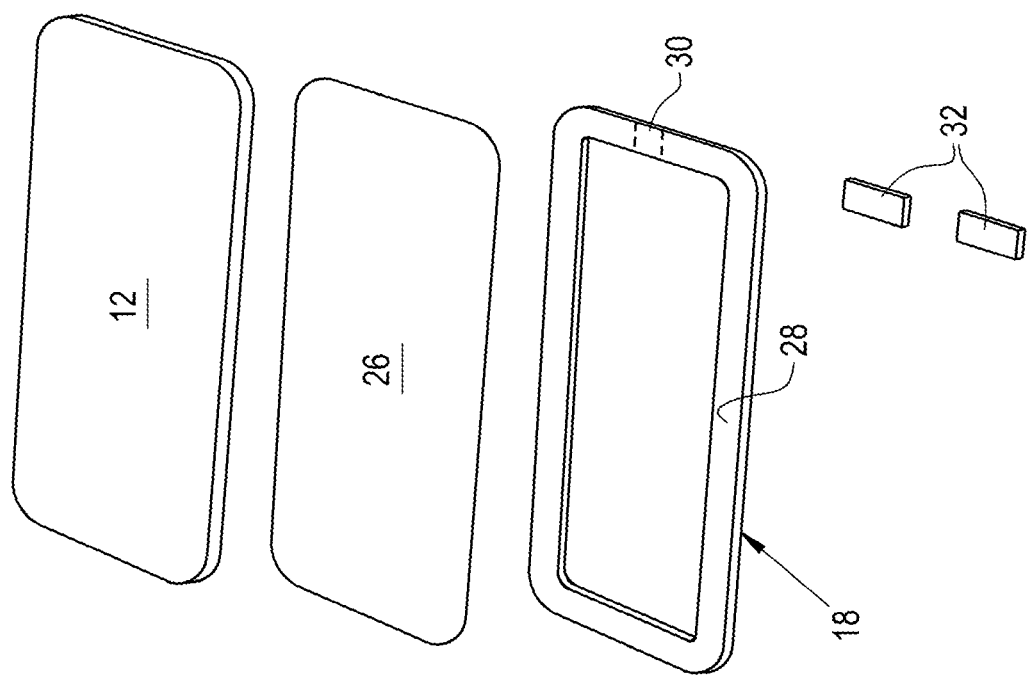
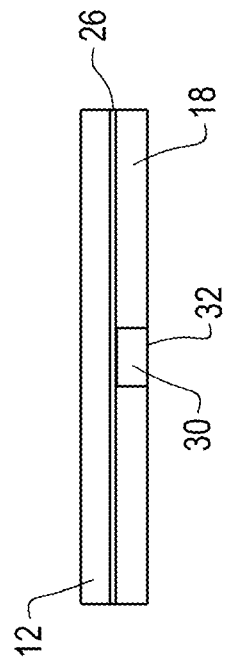
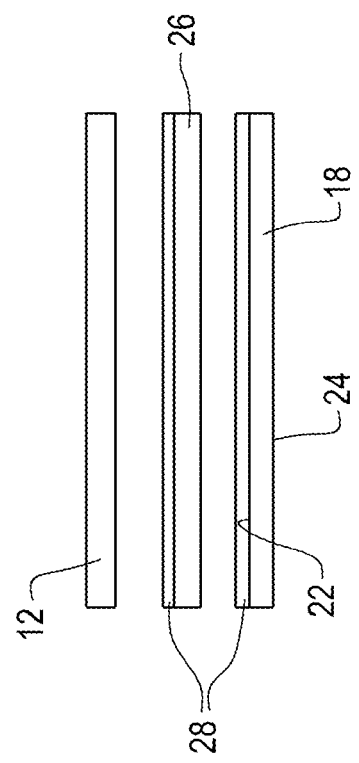

LIGHT-REDUCING DEVICES AND METHODS OF USE

CROSS-REFERENCE TO RELATED APPLICATIONS

This application claims the benefit of U.S. Provisional Application No. 62/713,017, filed Aug. 1, 2018, the contents of which are incorporated herein by reference.

BACKGROUND OF THE INVENTION

The present disclosure relates generally to devices and methods for reducing the transmission of light into a given location or space, and particularly relates to light-reducing devices that can be removably attached to a window or other panel through which light is able to pass.

Window tinting and shading are known in the art for all types of vehicles, including automobiles, boats, planes, or others. As used herein, the term "tinting" (and related forms thereof) will be used to refer to reducing the visible light transmission (VLT) through a window or other panel through which light is otherwise able to pass (hereinafter simply referred to as "window(s)" as a matter of convenience). Typically, tinting is achieved with a tinting medium in the form of a film that can be applied to a window, or is achieved as a result of a tinting medium being integral with or incorporated into the material of which the window is made. As such, tinting can be achieved as a retrofit to an existing automobile, boat or plane, or can be incorporated into an original or replacement window. In addition to the benefit of reducing visible light transmission, tinting can additionally be spectrally selective to block certain wavelengths, for example, to filter ultraviolet and/or infrared radiation to reduce fading and promote heat rejection.

Tinting is typically measured in terms of the percentage of visible light transmission that passes through a tinting medium, in which case a lower VLT percentage refers to greater tinting and 0% VLT indicates opacity. Using this description, tinting used in vehicles often range from relatively high tinting, such as 5% or less, to relatively low tinting, such as 70% or greater. However, window tinting for automobiles is highly regulated in many jurisdictions, and in some cases entirely prohibited.

As used herein, a window shading or shade refers to a non-transparent device intended to completely block light from entering a window or portion thereof. In vehicles, window shades include sun visors that may be permanently installed or installed as an aftermarket or retrofit accessory. For example, sun visors are often permanently attached adjacent a window, which limits their ability to block incoming sunlight to areas in proximity to their attachment point. Hybrid-type window shades are also used in vehicles that utilize a non-transparent material in which a plurality of small openings are formed to allow some light through the shade. The size and number of the openings determine the level of light that passes through the shade. This type of shade is not optically clear and ineffective at blocking ultraviolet (UV) rays. As such, it should be understood that window shading and window tinting (as used herein) refer to two separate and different techniques for reducing the visible light transmission through a window.

Federal regulations preclude airplane cockpits from using products that permanently mount to a window. In this situation, window tinting and window shading devices are limited to those that can be temporarily attached to a window or other part of the cockpit. However, such products often require a mounting structure that may unacceptably take up space and/or be unsightly. Other products that can be temporarily attached include removable window shades and tinting in the form of films that rely on static cling over their entire surfaces to secure them to a window. However, such films are not optically clear, pick up lint and dirt that can damage a window, create distractions when looking through the film, often fail to properly or securely adhere to a window, and/or may melt if exposed to excessive heat.

The aviation community, which includes general aviation pilots and their passengers, is significantly impacted with skin cancer due to high altitudes exposing them to greater radiation levels, along with no way to protect themselves because of regulations on what can be installed on aircraft windows. Importantly, existing temporary window shades and tinting that can be used in aircrafts do not provide the essential optical clarity that is required for a pilot to maintain situational awareness to maintain control of their aircraft and avoid midair collisions, bird strikes, and other hazards.

Thus, there is further need for a product or device that can be easily and temporarily attached to and easily removed from windows, including but not limited to those of an airplane cockpit.

BRIEF SUMMARY OF THE INVENTION

The present invention provides light-reducing devices that can be removably attached to a window or other panel through which light is able to pass, and to methods of using such devices.

According to one aspect of the invention, a light-reducing device includes a perimeter, a tinted flexible transparent sheet, and a microsuction tape adhered to the tinted flexible transparent sheet. The microsuction tape has a surface with micrometer-sized cavities that create a vacuum when the surface is pressed against a window. At least the surface of the tape is formed of a material that is sufficiently pliable and elastic so that each of the cavities forms a seal against the window and individual vacuums created between the surface and the window releasably secure the light-reducing device to the window when subjected to only the weight of the light-reducing device, but the light-reducing device can be peeled from the window.

According to another aspect of the invention, a method of using a light-reducing device as described above includes attaching the light-reducing device to a window by pressing the surface of the microsuction tape against the window, and later removing the light-reducing device from the window by peeling the surface of the microsuction tape from the window.

Technical aspects of devices and methods described above preferably include the ability to reduce visible light transmission in a vehicle, including airplanes, automobiles, etc., using a device that can be quickly applied and securely retained on a window, and also quickly removed. This capability enables pilots, drivers, and their passengers to protect themselves from harmful effects of sunlight, including glare, heat (infrared (IR) rays), and ultraviolet rays, while complying with legal limitations often applicable to permanent window tinting.

Other aspects and advantages of this invention will be appreciated from the following detailed description.

BRIEF DESCRIPTION OF THE SEVERAL VIEWS OF THE DRAWING

FIGS. 4A, 4B, and 4C schematically represent an exploded view, a cross-sectional view, and an exploded cross-sectional view, respectively, of a light-reducing device in accordance with a nonlimiting embodiment of the present invention.

DETAILED DESCRIPTION OF THE INVENTION

Figure 1:
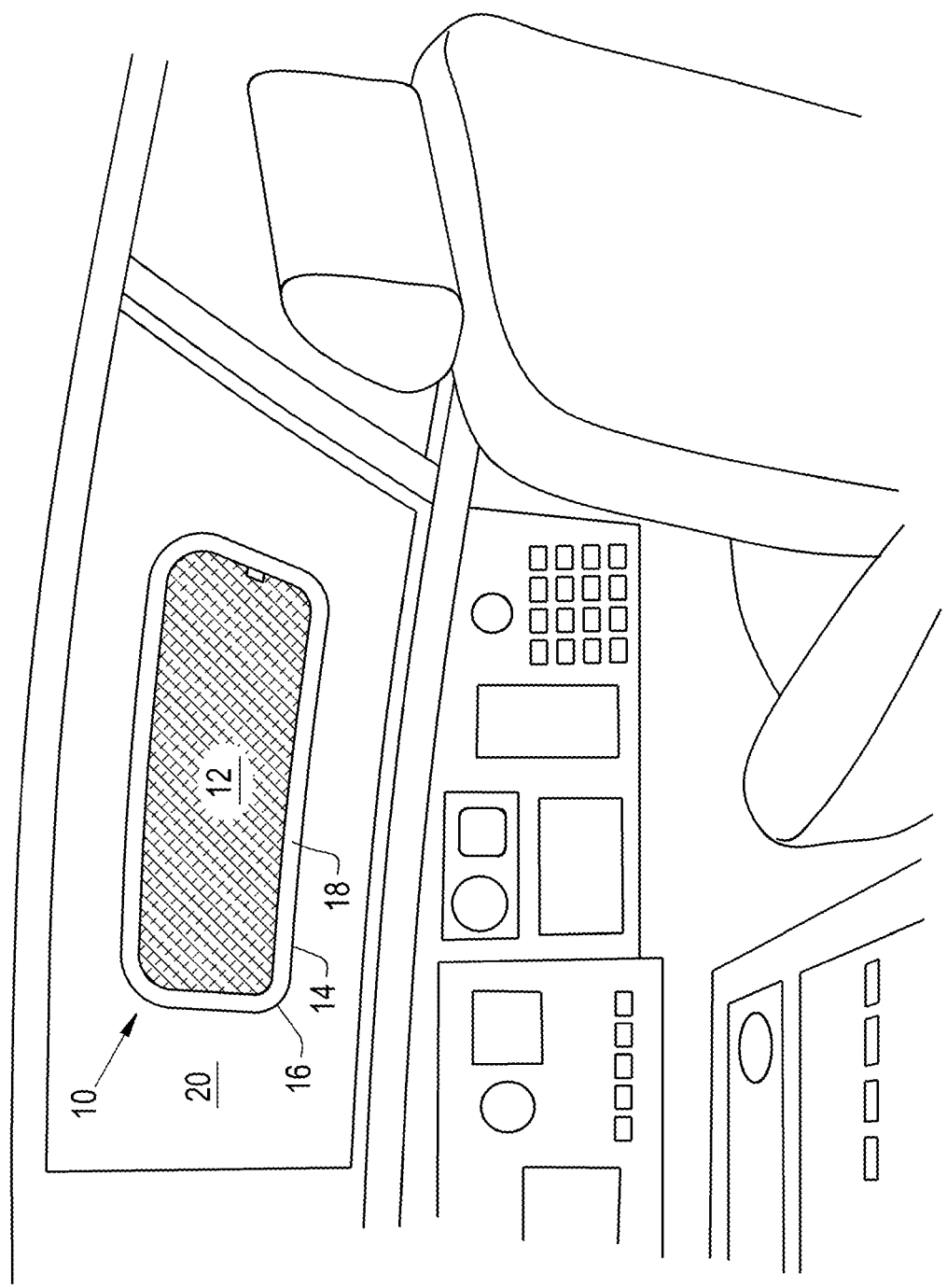
FIG. 1 represents a transparent light-reducing device mounted to a windshield of an airplane in accordance with a nonlimiting embodiment of the present invention.

The drawings represent different embodiments of removable light-reducing devices 10 adapted to reduce (filter) or entirely prevent (block) light from passing through a window. FIG. 1 represents a flexible transparent light-reducing device 10 having a generally rectangular-shaped outermost perimeter 14 with rounded corners 16. The device 10 comprises a flexible transparent sheet 12 and a microsuction tape 18 disposed adjacent the perimeter 14 of the sheet 12, and more preferably is contiguous with the sheet 12 at the perimeter 14 so as to form the perimeter 14 with the sheet 12. The device 10 is depicted as being removably attached with the microsuction tape 18 to a window 20 of an airplane, in this case a windshield of a general aviation airplane. The transparent sheet 12 may be, for example, a charcoal-tinted plasticized polyvinyl chloride (PVC) material that is also preferably capable of blocking (e.g., 99% or more) incident ultraviolet and/or infrared rays. However, it should be understood that sheets 12 formed of other tinting compounds and other flexible plastic materials could be used or later developed. On the other hand, acrylic and polycarbonate materials were determined to be too rigid to accommodate the extreme curves commonly found on windows of airplanes.

Though the degree of tinting, as a percent of VLT, can be widely varied depending on circumstances, a range of about 5% to 70% is believed to be typical for achieving desired reduced levels of sunlight, with an optimal % VLT believed to be about 15% under many circumstances found in aircrafts. According to preferred embodiments, the material of the sheet 12 is sufficiently flexible and elastic to enable the device 10 to be rolled up and stored conveniently for later use, and transported within a carrying case to provide a simple and effective way to reduce light in the cockpits of multiple different aircraft and on multiple different flights.

Figure 3:
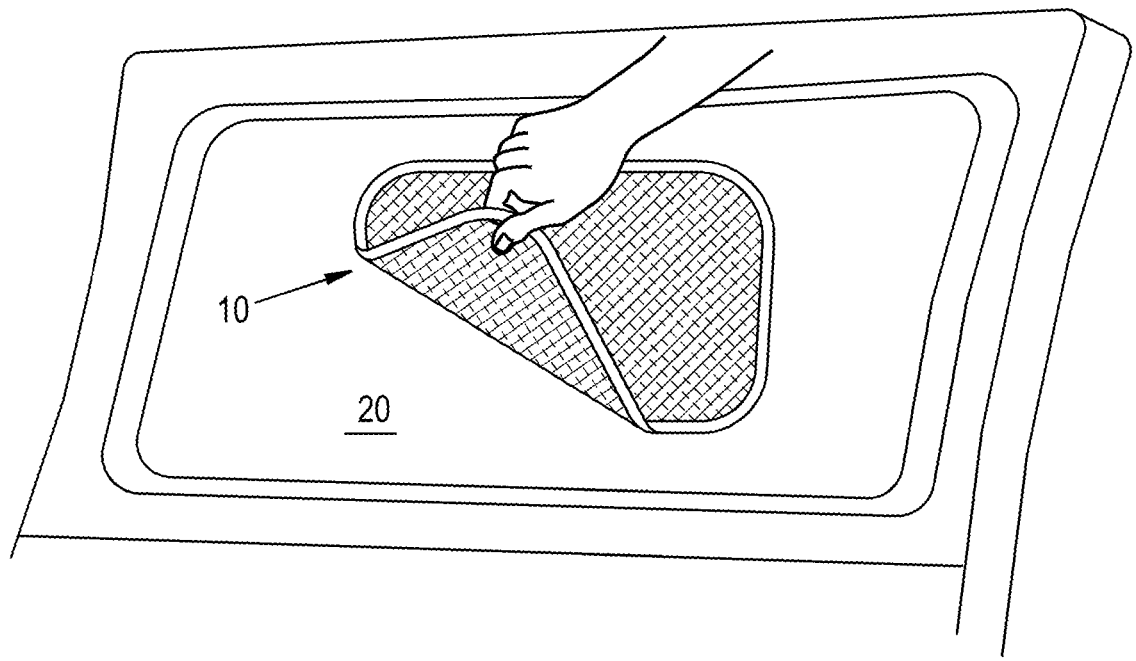
FIG. 3 represents a transparent light-reducing device of the type represented in FIG. 1 in the process of being removed from a window in accordance with a nonlimiting embodiment of the present invention.

The microsuction tape 18 is shown in FIG. 1 as continuous along the perimeter 14 of the device 10, though it is foreseeable that the tape 18 could be discontinuous. The tape 18 is generally opaque and therefore is preferably located only at the perimeter 14 so as to minimize any obstruction of the view through the sheet 12 and in particular to not obscure any portion of the view through the central region of the sheet 12. As represented in FIGS. 4A, 4B, and 4C, the microsuction tape 18 has opposing first and second surfaces 22 and 24, with the first surface 22 bearing an adhesive 28 adapted to permanently attach the tape 18 to other components of the device 10. The second surface 24 comprises numerous micrometer-sized air pockets or cavities (not represented) adapted to create a vacuum when the second surface 24 is pressed against glass or similarly smooth surfaces, nonlimiting examples of which include aircraft polycarbonate windows, single pane automotive windows, and residential and commercial dual pane windows. The material that defines the tape 18 (or at least its second surface 24 and cavities) is sufficiently pliable and elastic so that the cavities are able to form individual seals against the window 20. Pressing the surface 24 against the window 24 forces air out of the cavities in the surface 24, creating numerous individual vacuums within each cavity that, in combination, releasably but reliably secure the device 10 to the window 20 when subjected to only the weight of the device 10, but enables the device 10 to be easily peeled from the window 20 as shown in FIG. 3. A commercially available microsuction tape is reported as a plastic film (e.g., polyethylene terephthalate, also known as PET or polyester) having an acrylic foam layer in which the cavities are formed. However, it is foreseeable that a suitable microsuction tape 18 could be fabricated from similarly pliable and elastic materials.

The microsuction tape 18 allows for ease of use, requiring only that the device 10 be held up to and pressed against the window 20 to secure the device 10 to the window 20 solely along the perimeter 14 of the device 10. Because the micrometer-sized air pockets or cavities are not an adhesive or other traditional bonding material, the device 10 is able to remain on the window 20 regardless of temperature and altitude change, and enables the device 10 to be simply removed by grasping an edge (perimeter 14) of the device 10 and pulling the device 10 away from the window 20 so as to peel the device 10 from the window 20 as shown in FIG. 3. The microsuction tape 18 can be repeatedly used to attach the device 10 to a window 20 as long as a sufficient number of the cavities remain free of debris to properly create vacuums.

Other preferred but optional features of the device 10 are represented in FIGS. 4A, 4B, and 4C as including an optically clear layer 26 bonded with an adhesive 28 to the flexible transparent sheet 12. The clear layer 26 is more rigid than the sheet 12 to inhibit the sheet 12 from warping if exposed to high temperatures, and also provides an antistiction surface to float or separate the sheet 12 from the window 20, such that the tape 18 effectively spaces the sheet 12 (and layer 26) apart from the window 20 to promote a glass-like optical clarity for the device 10 even though the device 10 is flexible and made up of multiple layers. Suitable materials for the layer 26 include PET-based films (i.e., the layer 26 contains more polyethylene terephthalate than any other constituent), preferably have a visible light transmission capability of 90% VLT or more, and therefore have higher visible light transmission properties than the flexible transparent sheet 12. Nonlimiting examples of such films are commercially available from Eastman Chemical Company and Eastman Performance Films, LLC.

FIGS. 4A, 4B, and 4C also depict the device 10 as comprising a vent 30 created by a slot or gap in the tape 18 to promote airflow between the window 20 and either the sheet 12 or (if present) the clear layer 26. Optional decals 32 can be applied to bridge the vent 30, such that the tape surfaces 22 and 24 are substantially continuous. The vent 30 assures that pressure and temperature changes won't affect the performance of the device 10.

The device 10 is represented in FIG. 1 as covering only a portion of the window 20. Such a capability is intentional because often a pilot or passenger only needs a portion of a window to be tinted to sufficiently shield their eyes and other body portions from the glare and other effects of the sun. Because of the ease with which the device 10 can be applied and removed, one can easily adjust its positioning throughout a flight to correspond with the position of the sun. Alternatively, it is within the scope of the invention to tailor the size and shape of the device 10 to cover an entire window. For example, a device 10 can be provided in a kit that enables the manufacturer or end user to produce or modify the device 10 to fit the exact dimensions of a specific window, effectively providing a removable light-reducing device 10 for the entire window. As such, it should be understood that the size and shape of the device 10 can vary depending on the size and shape of a window and the user's particular needs or preferences.

Figure 2:
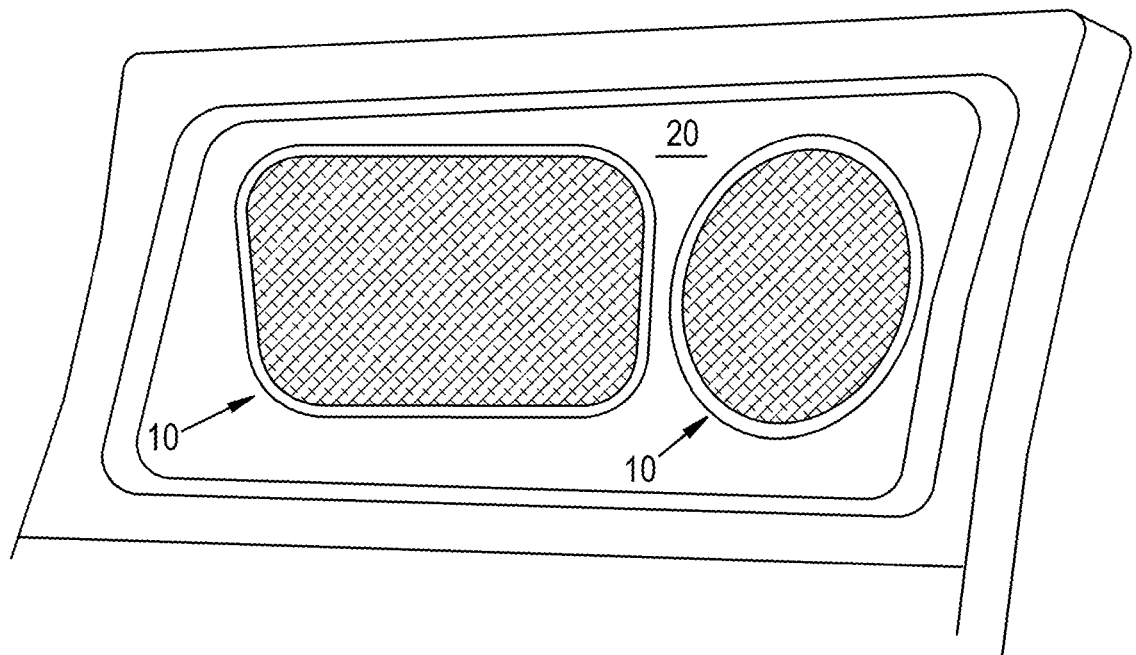
FIG. 2 represents a transparent light-reducing device of the type represented in FIG. 1 and a second transparent light-reducing device mounted to a door window of an airplane in accordance with nonlimiting embodiments of the present invention.

FIG. 2 represents a transparent light-reducing device 10 of the type represented in FIG. 1, as well as a second transparent light-reducing device 10 similar in construction and materials to the type represented in FIG. 1, but with a circular-shaped (oval) outermost perimeter 14. Both devices 10 are represented in FIG. 2 as attached to a window 20 (in this case, a door window) of an airplane.

It is also within the scope of the invention that a light-reducing device 10 could be constructed similar to those represented in FIGS. 1 and 2, but produced to be translucent or opaque either as a result of the degree of tinting (for example, 5% VLT or less) of the sheet 12, forming the sheet 12 of a translucent or opaque material, covering the entire surface of the sheet 12 with a layer formed of the tape material, and/or the inclusion of one or more additional layers. Though restricted for use in an airplane cockpit, translucent and opaque devices 10 of this invention can find uses on windows where only passengers are seated. Other aspects of translucent and opaque devices 10, including their constructions and materials, can otherwise be the same or similar to that of the devices 10 represented in FIGS. 1 and 2.

While the invention has been described in terms of particular embodiments, it should be apparent that alternatives could be adopted by one skilled in the art. For example, the devices 10 and their components could differ in appearance and construction from the embodiments described herein and shown in the drawings, functions of certain components of the devices 10 could be performed by components of different construction but capable of a similar (though not necessarily equivalent) function, and appropriate materials could be substituted for those noted. As such, it should be understood that the above detailed description is intended to describe the particular embodiments represented in the drawings and certain but not necessarily all features and aspects thereof, and to identify certain but not necessarily all alternatives to the represented embodiments and their described features and aspects. As a nonlimiting example, the invention encompasses additional or alternative embodiments in which one or more features or aspects of a particular embodiment could be eliminated or two or more features or aspects of different embodiments could be combined. Accordingly, it should be understood that the invention is not necessarily limited to any embodiment described herein or illustrated in the drawings, and the phraseology and terminology employed above are for the purpose of describing the illustrated embodiments and do not necessarily serve as limitations to the scope of the invention. Therefore, the scope of the invention is to be limited only by the following claims.

The invention claimed is:

1. A light-reducing device removably attachable to a window through which light is able to pass, the light-reducing device comprising:
    a perimeter surrounding a central region of the light-reducing device;
    a tinted flexible transparent sheet and a microsuction tape adhered to the tinted flexible transparent sheet adjacent the perimeter of the light-reducing device, the microsuction tape comprising a foam layer having a surface in which micrometer-sized cavities are formed that create a vacuum when the surface is pressed against a window, at least the surface of the tape being formed of a material that is sufficiently pliable and elastic so that each of the cavities forms a seal against the window and individual vacuums created between the surface and the window releasably secure the light-reducing device to the window when subjected to only the weight of the light-reducing device, but the light-reducing device can be peeled from the window; and
    an optically clear layer that is bonded to the tinted flexible transparent sheet, has a visible light transmission of about 90% or more, and is more rigid than the tinted flexible transparent sheet;
    wherein the microsuction tape has at least one gap therein at the perimeter of the light-reducing device but is otherwise continuous along the perimeter of the light-reducing device, and the microsuction tape is located only at the perimeter so as to not obscure any portion of the central region of the light-reducing device.

2. The light-reducing device according to claim 1, wherein the microsuction tape spaces the light-reducing device apart from the window and airflow between the light-reducing device and the window is promoted by at least one vent defined by the at least one gap in the microsuction tape.

3. The light-reducing device according to claim 1, wherein the tinted flexible transparent sheet and the microsuction tape define together the perimeter of the light-reducing device.

4. The light-reducing device according to claim 1, wherein the light-reducing device is releasably secured by the microsuction tape to the window, and the window is a windshield or window of an aircraft.

5. The light-reducing device according to claim 1, wherein the light-reducing device is solely releasably secured by the microsuction tape to the window.

6. The light-reducing device according to claim 1, wherein the tinted flexible transparent sheet is formed of tinted plasticized polyvinyl chloride.

7. The light-reducing device according to claim 1, wherein the tinted flexible transparent sheet has a visible light transmission of about 5% to about 70%.

8. The light-reducing device according to claim 1, wherein the tinted flexible transparent sheet has a visible light transmission of about 15%.

9. The light-reducing device according to claim 1, wherein the tinted flexible transparent sheet blocks ultraviolet and infrared rays.

10. The light-reducing device according to claim 1, wherein the microsuction tape spaces the tinted flexible transparent sheet apart from the window.

11. The light-reducing device according to claim 1, further comprising a vent defined by the at least one gap in the microsuction tape and promoting airflow between the window and the tinted flexible transparent sheet.

12. A method of using the light-reducing device of claim 1, the method comprising:
    attaching the light-reducing device to a window by pressing the surface of the microsuction tape against the window; and later removing the light-reducing device from the window by peeling the surface of the microsuction tape from the window.

13. The method of claim 12, wherein the window is a windshield or window of an aircraft.

14. The method of claim 13, wherein the light-reducing device is attached and removed during flight of the aircraft.

15. A light-reducing device removably attachable to a window through which light is able to pass, the light-reducing device comprising:
  a perimeter;
  a tinted flexible transparent sheet and a microsuction tape adhered to the tinted flexible transparent sheet, the microsuction tape having a surface comprising micrometer-sized cavities that create a vacuum when the surface is pressed against a window, at least the surface of the tape being formed of a material that is sufficiently pliable and elastic so that each of the cavities forms a seal against the window and individual vacuums created between the surface and the window releasably secure the light-reducing device to the window when subjected to only the weight of the light-reducing device, but the light-reducing device can be peeled from the window; and
  an optically clear layer bonded to the tinted flexible transparent sheet, the optically clear layer being more rigid than the tinted flexible transparent sheet and inhibiting the tinted flexible transparent sheet from warping.

16. The light-reducing device according to claim 15, wherein the optically clear layer defines an anti-stiction surface to float or separate the tinted flexible transparent sheet from the window to enable the microsuction tape to space the tinted flexible transparent sheet and the optically clear layer apart from the window.

17. The light-reducing device according to claim 15, wherein the optically clear layer is a polyethylene terephthalate-based film.

18. The light-reducing device according to claim 15, wherein the optically clear layer has a visible light transmission that is greater than the tinted flexible transparent sheet.

19. The light-reducing device according to claim 18, wherein the optically clear layer has a visible light transmission of about 90% or more.

20. The light-reducing device according to claim 15, further comprising a vent defined in the microsuction tape and promoting airflow between the window and the optically clear layer.

* * * * *